United States Patent
Lim et al.

(10) Patent No.: US 11,018,961 B1
(45) Date of Patent: May 25, 2021

(54) METHOD AND DEVICE FOR EFFICIENT END-TO-END MONITORING OF MASSIVE TRANSACTIONS

(71) Applicant: TMAXSOFT CO., LTD., Seongnam-si (KR)

(72) Inventors: So Yeon Lim, Seoul (KR); Jun Soo Jeong, Seongnam-si (KR)

(73) Assignee: TMAXSOFT CO., LTD., Seongnam-si (KR)

( * ) Notice: Subject to any disclaimer, the term of this patent is extended or adjusted under 35 U.S.C. 154(b) by 0 days.

(21) Appl. No.: 16/724,314

(22) Filed: Dec. 22, 2019

(30) Foreign Application Priority Data

Nov. 27, 2019 (KR) .......................... 10-2019-0154935

(51) Int. Cl.
*G06F 15/173* (2006.01)
*H04L 12/26* (2006.01)
*H04L 29/08* (2006.01)

(52) U.S. Cl.
CPC ............ *H04L 43/045* (2013.01); *H04L 43/10* (2013.01); *H04L 67/025* (2013.01)

(58) Field of Classification Search
CPC ...... H04L 43/045; H04L 43/10; H04L 67/025
USPC .................................. 709/202–203, 223–224
See application file for complete search history.

(56) References Cited

U.S. PATENT DOCUMENTS

| | | | | |
|---|---|---|---|---|
| 9,736,215 B1 * | 8/2017 | Doe | ........................ | H04L 67/02 |
| 10,114,729 B2 * | 10/2018 | Baartmans | .......... | G06F 11/3495 |
| 10,164,779 B2 * | 12/2018 | Uhr | ..................... | H04L 63/0823 |
| 2011/0283263 A1 * | 11/2011 | Gagliardi | ............ | G06F 11/3612 717/130 |
| 2012/0246287 A1 * | 9/2012 | Malloy | ................... | H04L 67/22 709/223 |
| 2014/0280892 A1 * | 9/2014 | Reynolds | ............ | H04L 43/0876 709/224 |

FOREIGN PATENT DOCUMENTS

| | | | |
|---|---|---|---|
| JP | 2005-027252 | A | 1/2005 |
| KR | 10-2005-0091470 | A | 9/2005 |
| KR | 10-2018-0132287 | A | 12/2018 |

OTHER PUBLICATIONS

Office Action dated Nov. 3, 2020, in corresponding Korean patent Application No. 10-2019-0154935, 6 pages.

* cited by examiner

*Primary Examiner* — Bharat Barot
(74) *Attorney, Agent, or Firm* — Xsensus LLP

(57) ABSTRACT

A method for efficient end-to-end monitoring of massive transactions related to a monitored system including at least one web server, and at least one web application server is provided. The method includes steps of: (a) a trace information inputting device performing a process of instructing the web server and the web application server included in the monitored system to generate each of multiple pieces of individual trace information including transaction identification information and transaction sequence information; and (b) if the multiple pieces of the individual trace information, including the transaction identification information and the transaction sequence information, are acquired from the web server and the web application server, the trace information inputting device performing a process of storing the multiple pieces of the individual trace information in a trace information storing unit.

14 Claims, 4 Drawing Sheets

METHOD AND DEVICE FOR EFFICIENT END-TO-END MONITORING OF MASSIVE TRANSACTIONS

CROSS REFERENCE TO RELATED APPLICATION

This application claims the benefit of foreign priority to Korean Application 10-2019-0154935 filed Nov. 27, 2019, the entire contents of which being incorporated herein by reference.

FIELD OF THE DISCLOSURE

The present disclosure relates to a method for efficient end-to-end monitoring of massive transactions related to a monitored system including at least one web server, and at least one web application server, and a trace information inputting device using the same.

BACKGROUND OF THE DISCLOSURE

With a server structure divided into a plurality of layers, it is necessary to monitor work flow of operations performed by servers until a response corresponding to a user's request is delivered to the user, and to quickly track a failure when the failure occurs. Therefore, an end-to-end monitoring technique is used to allow detailed analysis on transactions of each server, using a display with diagrams showing the work flow.

In particular, in order to monitor services performed by each server handling massive transactions, a process of collecting a large amount of information, analyzing the collected information, and displaying the collected information on the user's terminal is required. However, since a large amount of monitoring information is collected from the massive transactions, it is difficult for a monitoring device to perform a process of simultaneously storing a large amount of data suitable for an administrative user and finally delivering the data to the administrative user.

Figure 4:
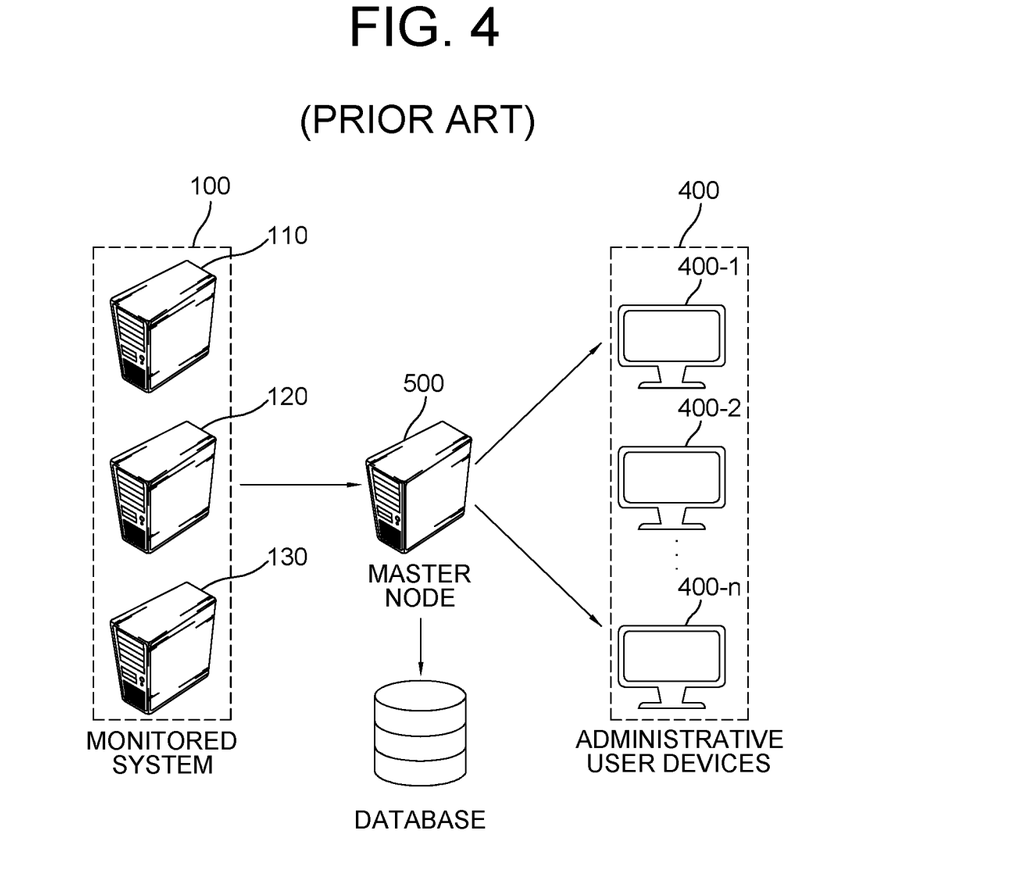
FIG. 4 is a drawing schematically illustrating a general configuration of a conventional monitoring device.

Referring to FIG. 4 illustrating a conventional monitoring device, an event correlation for the end-to-end monitoring was conventionally performed in a monitored system rather than in a database. For reference, correlation refers to a process of connecting all pieces of trace information of a specific transaction. However, since the monitored system needs to perform the correlation task in addition to the massive transactions that the monitored system must handle, time required for transmitting the monitoring data to a master node for managing the monitoring increases. As a result, properly timing garbage collection in the monitored system becomes difficult, a lot of heap memory is consumed, and the monitored system may be adversely affected.

In addition, in order to avoid the problems above, when the monitoring data is sent to the master node that manages the monitored system and the monitoring data is inputted into and outputted from the database by the master node, then processing of all threads of the master node may be temporarily put on hold because the monitoring data itself is massive. Accordingly, other requests coming to the master node except the monitoring tasks, while the threads are put on hold, may accumulate in its task queue, and as a result, a lot of memory is consumed, which may adversely affect the master node.

In addition, the monitoring device generally uses query statements when storing the monitoring data in the database, but, since the monitoring device needs additional time to parse and bind the query statement, the speed of inputting and outputting the monitoring data is slower than the speed of general network transmission.

Also, since each system time of each server may be out of synchronization, when performing the correlation task based on each server time measured at the time when the correlation task is performed in each service module, multiple pieces of trace information may not be sorted in the order of generation thereof.

PRIOR ART

Cited Patent Literature

Korean Patent Application No. KR10-1828156 B1

SUMMARY OF THE DISCLOSURE

It is an object of the present disclosure to solve all the aforementioned problems.

It is another object of the present disclosure to rapidly store a large amount of information in a massive transaction situation.

It is still another object of the present disclosure to use minimal resource by performing correlation task using an administrative device, to thereby display more information on the administrative device.

It is still yet another object of the present disclosure to process the correlation task on trace information, based on transaction sequence information and transaction identification information, to thereby allow tracking of whole work flow even when times of different servers are not synchronized.

In accordance with one aspect of the present disclosure, there is provided a method for efficient end-to-end monitoring of massive transactions related to a monitored system including at least one web server, and at least one web application server, including steps of: (a) a trace information inputting device performing a process of instructing the web server and the web application server included in the monitored system to generate each of multiple pieces of individual trace information including transaction identification information and transaction sequence information; and (b) if the multiple pieces of the individual trace information, including the transaction identification information and the transaction sequence information, are acquired from the web server and the web application server, the trace information inputting device performing a process of storing the multiple pieces of the individual trace information in a trace information storing unit.

As one example, at the step of (a), if a request for processing transactions is acquired from a client, the trace information inputting device performs a process of instructing the web server and the web application server included in the monitored system to assign identical transaction identification information and each piece of hierarchical transaction sequence information to each of the transactions of each of the web server and the web application server, to thereby generate each of the multiple pieces of the individual trace information corresponding to the request.

As one example, at the step of (a), on condition that the web server includes a 1-st service module to an m-th service module wherein m is an integer larger than 0, and that the web application server includes an (m+1)-th service module to an n-th service module wherein n is an integer larger than said m, the trace information inputting device performs a process of instructing the web server and the web application server to assign each piece of the hierarchical transaction sequence information to each of the transactions corresponding to the request, wherein k-th transaction sequence information is assigned to a request transaction transmitted from a k-th service module to a (k+1)-th service module and to a response transaction transmitted from the (k+1)-th service module to the k-th service module and k is an integer larger than 0 and less than n and, wherein, in case said k is larger than 1, the k-th transaction sequence information is hierarchically lower than (k−1)-th transaction sequence information, the (k−1)-th transaction sequence information being assigned to a request transaction transmitted from a (k−1)-th service module to the k-th service module and to a response transaction transmitted from the k-th service module to the (k−1)-th service module.

As one example, the trace information inputting device performs a process of instructing the web server and the web application server included in the monitored system to assign the identical transaction identification information to each of request transactions and each of response transactions, created and transmitted in response to the request, to which each of 1-st transaction sequence information to (n−1)-th transaction sequence information is assigned.

As one example, at the step of (b), the trace information inputting device performs a process of storing the multiple pieces of the individual trace information, including the transaction identification information and the transaction sequence information, in the trace information storing unit as one or more byte arrays.

As one example, at the step of (b), the trace information inputting device performs a process of storing the multiple pieces of the individual trace information in the trace information storing unit, only using a writing access.

As one example, the method further comprises a step of: (c) the trace information inputting device performing a process of instructing an administrative user device of an administrative user to (i) retrieve multiple pieces of specific trace information among the individual trace information from the trace information storing unit, and (ii) display the multiple pieces of the specific trace information to be used for confirmation by the administrative user.

As one example, at the step of (c), the trace information inputting device performs a process of instructing the administrative user device to generate integrated trace information in which the multiple pieces of the specific trace information are correlated by referring to the transaction identification information and the transaction sequence information, and display the integrated trace information.

As one example, the transaction identification information includes at least one GUID (Globally Unique Identifier), and the transaction sequence information includes at least one execution flow number, and wherein, at the step of (c), the trace information inputting device performs a process of instructing the administrative user device to correlate the multiple pieces of the specific trace information by referring to the GUID and the execution flow number, to thereby generate the integrated trace information.

As one example, the multiple pieces of the individual trace information further includes service start/end information and service module information, and wherein, at the step of (c), the trace information inputting device performs a process of instructing the administrative user device to correlate the multiple pieces of the specific trace information by further referring to the service start/end information and the service module information, to thereby generate the integrated trace information.

In accordance with another aspect of the present disclosure, there is provided a trace information inputting device for efficient end-to-end monitoring of massive transactions related to a monitored system including at least one web server, and at least one web application server, including: at least one memory that stores instructions; and at least one processor configured to execute the instructions to perform or support another device to perform: (I) a process of instructing the web server and the web application server included in the monitored system to generate each of multiple pieces of individual trace information including transaction identification information and transaction sequence information and (II) if the multiple pieces of the individual trace information, including the transaction identification information and the transaction sequence information, are acquired from the web server and the web application server, a process of storing the multiple pieces of the individual trace information in a trace information storing unit.

As one example, at the process of (I), if a request for processing transactions is acquired from a client, the processor performs a process of instructing the web server and the web application server included in the monitored system to assign identical transaction identification information and each piece of hierarchical transaction sequence information to each of the transactions of each of the web server and the web application server, to thereby generate each of the multiple pieces of the individual trace information corresponding to the request.

As one example, at the process of (I), on condition that the web server includes a 1-st service module to an m-th service module wherein m is an integer larger than 0, and that the web application server includes an (m+1)-th service module to an n-th service module wherein n is an integer larger than said m, the processor performs a process of instructing the web server and the web application server to assign each piece of the hierarchical transaction sequence information to each of the transactions corresponding to the request, wherein k-th transaction sequence information is assigned to a request transaction transmitted from a k-th service module to a (k+1)-th service module and to a response transaction transmitted from the (k+1)-th service module to the k-th service module and k is an integer larger than 0 and less than n and, wherein, in case said k is larger than 1, the k-th transaction sequence information is hierarchically lower than (k−1)-th transaction sequence information, the (k−1)-th transaction sequence information being assigned to a request transaction transmitted from a (k−1)-th service module to the k-th service module and to a response transaction transmitted from the k-th service module to the (k−1)-th service module.

As one example, the processor performs a process of instructing the web server and the web application server included in the monitored system to assign the identical transaction identification information to each of request transactions and each of response transactions, created and transmitted in response to the request, to which each of 1-st transaction sequence information to (n−1)-th transaction sequence information is assigned.

As one example, at the process of (II), the processor performs a process of storing the multiple pieces of the individual trace information, including the transaction identification information and the transaction sequence information, in the trace information storing unit as one or more byte arrays.

As one example, at the process of (II), the processor performs a process of storing the multiple pieces of the individual trace information in the trace information storing unit, only using a writing access.

As one example, the processor further performs: (III) a process of instructing an administrative user device of an administrative user to (i) retrieve multiple pieces of specific trace information among the individual trace information from the trace information storing unit, and (ii) display the multiple pieces of the specific trace information to be used for confirmation by the administrative user.

As one example, at the process of (III), the processor performs a process of instructing the administrative user device to generate integrated trace information in which the multiple pieces of the specific trace information are correlated by referring to the transaction identification information and the transaction sequence information, and display the integrated trace information.

As one example, the transaction identification information includes at least one GUID (Globally Unique Identifier), and the transaction sequence information includes at least one execution flow number, and wherein, at the process of (III), the processor performs a process of instructing the administrative user device to correlate the multiple pieces of the specific trace information by referring to the GUID and the execution flow number, to thereby generate the integrated trace information.

As one example, the multiple pieces of the individual trace information further includes service start/end information and service module information, and wherein, at the process of (III), the processor performs a process of instructing the administrative user device to correlate the multiple pieces of the specific trace information by further referring to the service start/end information and the service module information, to thereby generate the integrated trace information.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

The headings and abstract of the present disclosure provided herein are for convenience only and do not limit or interpret the scope or meaning of the embodiments.

To allow those skilled in the art to the present disclosure to be carried out easily, the example embodiments of the present disclosure by referring to attached diagrams will be explained in detail as shown below. Those skilled in the art may easily understand that the present disclosure is implemented using a combination of computer hardwares and softwares.

Figure 1:
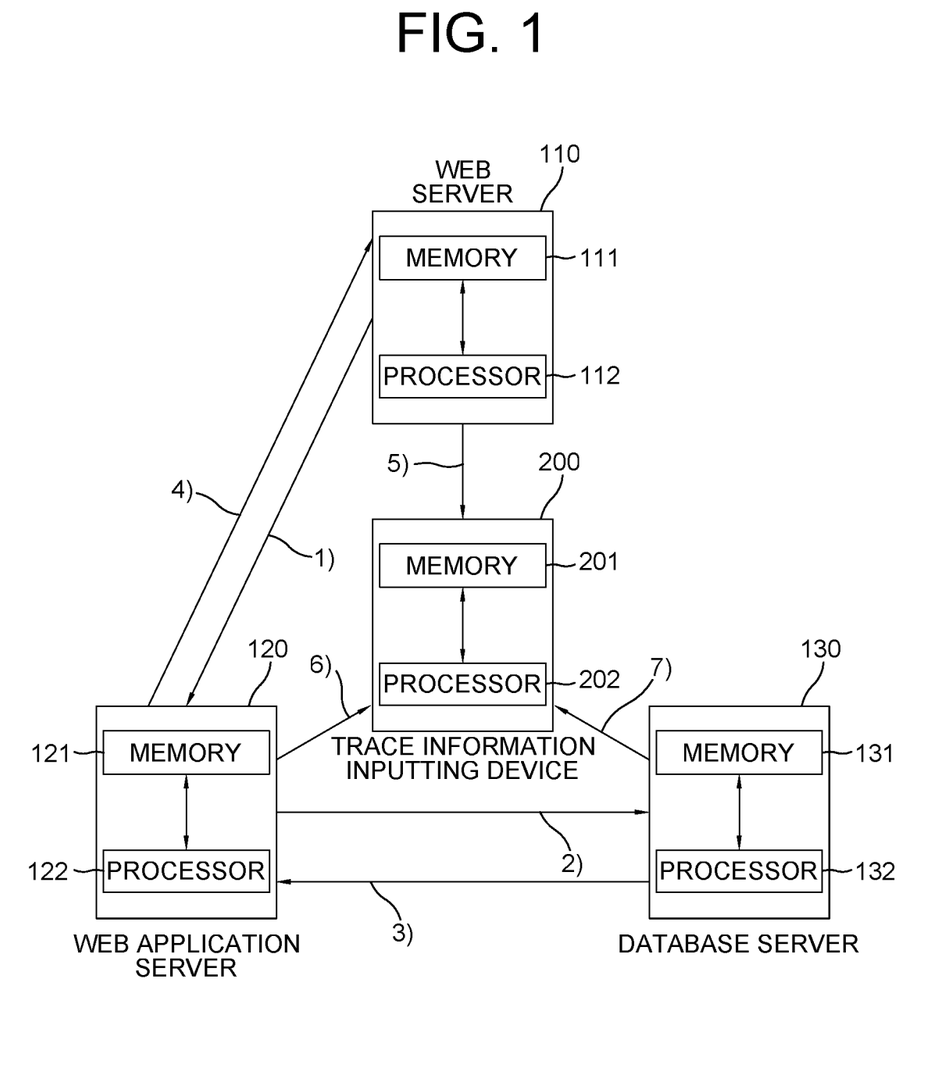
FIG. 1 is a drawing schematically illustrating at least one web server, at least one web application server, and at least one database server, included in a monitored system, and a trace information inputting device, in a method for efficient end-to-end monitoring of massive transactions related to the monitored system in accordance with one example embodiment of the present disclosure.

FIG. 1 is a drawing schematically illustrating at least one web server 110, at least one web application server 120, and at least one database server 130, included in a monitored system 100, and a trace information inputting device 200, in a method for efficient end-to-end monitoring of massive transactions related to the monitored system 100 in accordance with one example embodiment of the present disclosure. Throughout the present disclosure, the monitored system may or may not include the database server.

First, by referring to FIG. 1, work flow of the efficient end-to-end monitoring of the massive transactions related to the monitored system 100 is described.

For example, if an HTTP request is acquired from a client device (not illustrated) of a client, then the web server 110, the web application server 120 and the database server 130, included in the monitored system 100 may process the HTTP request sequentially. Herein, the database server 130 may or may not be included in the monitored system 100.

Specifically, the web server 110 may receive the HTTP request from an entity, e.g., the client device, connected over a network or locally with the web server 110, and may transmit the HTTP request to the web application server 120 as the arrow 1).

And, the web application server 120 may transmit a query statement to the database server 130 as the arrow 2) in response to the HTTP request, and if a response corresponding to the query statement is received from the database server 130 as the arrow 3), the web application server 120 may transmit the response to the web server 110 as the arrow 4).

Further, multiple pieces of trace information related to the response, according to the request, may be collected. That is, each of the web server 110, the web application server 120, and the database server 130 may transmit each piece of the trace information on its own task to the trace information inputting device 200 as the arrows 5) to 7). This shows that the present disclosure has a characteristic of a writing access only.

Herein, the trace information may be information on execution, performed in response to the request from the client, of each of service modules in each server of the monitored system 100.

The trace information inputting device 200 may include a memory 201 and a processor 202.

First, the memory 201 of the trace information inputting device 200 may store instructions, and specifically, the instructions may be computer software allowing the processor 202 of the trace information inputting device 200 to function in a specific way, and may be stored in a memory usable or readable by a computer or any programmable data processing devices. The instructions may perform processes for executing functions shown in the drawings.

Further, the processor 202 of the trace information inputting device 200 may include hardware configuration of MPU (Micro Processing Unit) or CPU (Central Processing Unit), cache memory, data bus, etc. Additionally, OS and software configuration of applications that achieve specific purposes may be further included.

Meanwhile, each of the web server 110, the web application server 120 and the database server 130 included in the monitored system 100 may include each of memories 111, 121 and 131 and each of processors 112, 122 and 132, similarly to the trace information inputting device 200, and description thereof is omitted since the description is similar to description of the memory 201 and the processor 202 of the trace information inputting device 200.

Figure 2:
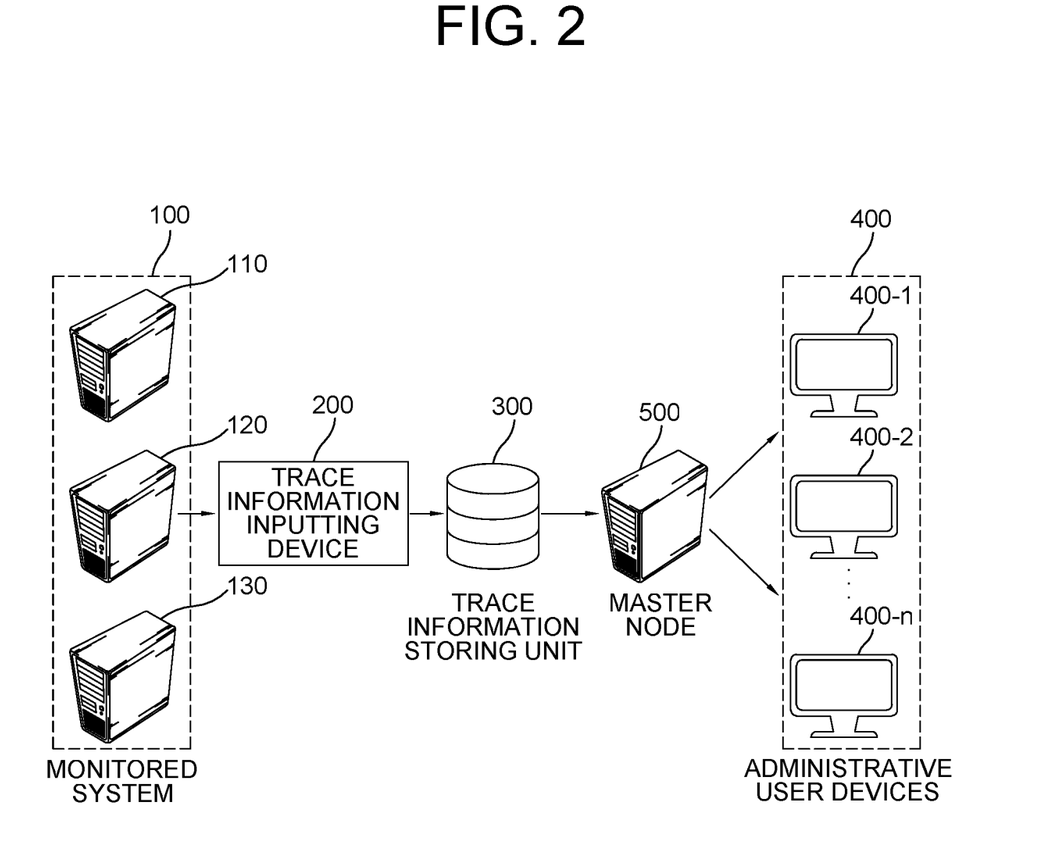
FIG. 2 is a drawing schematically illustrating a process of storing, correlating and displaying multiple pieces of individual trace information on one or more administrative user devices in the method for efficient end-to-end monitoring of the massive transactions related to the monitored system in accordance with one example embodiment of the present disclosure.

Next, a process of generating, storing, correlating, and displaying multiple pieces of individual trace information on an administrative user device 400 is described by referring to FIG. 2.

For convenience of description, FIG. 2 shows that the single web server 110, the single web application server 120, and the single database server 130 are included in the monitored system 100, but the scope of the present disclosure is not limited thereto, and the monitored system 100 may include one or more web servers 110, one or more web application servers 120, and one or more database servers 130.

First, for efficient end-to-end monitoring of the massive transactions related to the monitored system 100 including the web server 110, the web application server 120, and the database server 130, the trace information inputting device 200 may allow the web server 110 and the web application server 120 included in the monitored system 100 to generate each piece of the individual trace information including transaction identification information and transaction sequence information.

The multiple pieces of the individual trace information may include the transaction identification information and the transaction sequence information, and in detail, the transaction identification information may include at least one GUID (Globally Unique Identifier), and the transaction sequence information may include at least one execution flow number.

In addition, each of the multiple pieces of the individual trace information may further include each piece of service start/end information and each piece of service module information.

Herein, the GUID, i.e., the globally unique identifier, may be a pseudo-random number used in application software. Although the GUID is not unique, however, a total number of the GUIDs is two to the power of 128, thus a probability of collision is very low if a proper algorithm is used.

And, among both sides of a specific period among one or more periods in a specific execution flow number, one side of the specific execution flow number preceding the specific period may represent a parent sequence, and the other side of the execution flow number following the specific period may represent a child sequence. As such, since the specific execution flow number is delimited by each of the periods, flow of transactions processed by each server is easily confirmed, and a hierarchy of the transactions is easily confirmed. Throughout the present disclosure, the transactions are at least part of a terminal transaction and internal transactions, that will be clearly understood from context, in which the terminal transaction is directly related to the client, and the internal transactions are processed in the servers.

Further, if a request for processing transactions is acquired from the client, the trace information inputting device 200 may perform a process of instructing each of the web server 110 and the web application server 120 included in the monitored system 100 to assign (i) identical transaction identification information and (ii) each piece of hierarchical transaction sequence information to each of the transactions of each of the web server 110 and the web application server 120, to thereby generate each piece of the individual trace information corresponding to the request.

For example, if a request for processing a transaction A and a request for processing a transaction B are acquired from the client, the trace information inputting device 200 may allow the web server 110 and the web application server 120 to (i) assign a GUID 1000, as the transaction identification information, to the request for processing the transaction A, and (ii) assign a GUID 1001, as the transaction identification information, to the request for processing the transaction B.

Further, on condition that the web server 110 includes a 1-st service module to an m-th service module, and that the web application server 120 includes an (m+1)-th service module to an n-th service module, the trace information inputting device 200 may perform a process of instructing the web server 110 and the web application server 120 to assign each piece of hierarchical transaction sequence information to each of the transactions corresponding to the request, and k-th transaction sequence information may be assigned to a request transaction transmitted from a k-th service module to a (k+1)-th service module and to a response transaction transmitted from the (k+1)-th service module to the k-th service module. Herein, m may be an integer larger than 0, n may be an integer larger than said m, and k may be an integer larger than 0 and less than n.

In detail, in case said k is larger than 1, the k-th transaction sequence information may be hierarchically lower than (k−1)-th transaction sequence information. Herein, the (k−1)-th transaction sequence information is assigned to a request transaction transmitted from a (k−1)-th service module to the k-th service module and to a response transaction transmitted from the k-th service module to the (k−1)-th service module.

Also, the trace information inputting device 200 may perform a process of instructing the web server 110 and the web application server 120 included in the monitored system 100 to assign the identical transaction identification information to each of request transactions and each of response transactions, created and transmitted in response to the request, to which each of 1-st transaction sequence information to (n−1)-th transaction sequence information is assigned.

For example, on condition that the 1-st service module and the 2-nd service module are present in the web server 110, and that the 3-rd service module, the 4-th service module, and the 5-th service module are present in the web application server 120, if the request for processing the transaction is acquired from the client, the trace information inputting device 200 may instruct the web server 110 and the web application server 120 to assign specific transaction identification information, e.g., GUID 1000, to each of the request transactions and each of the response transactions corresponding to the request. That is, the GUID 1000, which is the identical transaction identification information, may be assigned to all transactions created in response to the request.

And, taking an example of the web application server 120, 1.3.2 may be assigned to a request transaction A transmitted from the 3-rd service module to the 4-th service module and to a response transaction A transmitted from the 4-th service module to the 3-rd service module. Further, 1.3.2.1 may be assigned to a request transaction B transmitted from the 4-th service module to the 5-th service module and to a response transaction B transmitted from the 5-th service module to the 4-th service module.

That is, since the request transaction B is a request transaction transmitted in response to the request transaction A, the transaction sequence information assigned to the request transaction B may correspond to a hierarchically lower transaction sequence information than the transaction sequence information assigned to the request transaction A. This is easily deduced from a fact that the transaction sequence information assigned to the request transaction B is 1.3.2.1 which is addition of 1 to 1.3.2, i.e., the transaction sequence information assigned to the request transaction A.

And, the trace information, corresponding to the request transaction A transmitted from the 3-rd service module to the 4-th service module, may include its own service start information, and the trace information, corresponding to the response transaction A transmitted from the 4-th service module to the 3-rd service module, may include its own service termination information.

Similarly, the trace information, corresponding to the request transaction B transmitted from the 4-th service module to the 5-th service module, may include its own service start information, and the trace information, corresponding to the response transaction B transmitted from the 5-th service module to the 4-th service module, may include its own service termination information.

And if the multiple pieces of the individual trace information, including the transaction identification information and the transaction sequence information, are acquired from the web server 110 and the web application server 120, the trace information inputting device 200 may perform a process of storing the multiple pieces of the individual trace information in a trace information storing unit 300.

Herein, the trace information storing unit 300 may be a separate storage space independent of the trace information inputting device 200, but the scope of the present disclosure is not limited thereto, and may be a storage space included in the trace information inputting device 200, or may be included in the database server 130 of the monitored system 100.

As an example, the trace information inputting device 200 may perform a process of storing the multiple pieces of the individual trace information, including the transaction identification information and the transaction sequence information, in the trace information storing unit 300 as one or more byte arrays.

As aforementioned, conventionally, a monitoring device stores the trace information in the database by using SQL (Structured Query Language). However, conventionally, interpretation of the SQL is required when the trace information is stored in and retrieved from the database, which takes quite some time.

But the trace information inputting device 200 may store the multiple pieces of the individual trace information in the trace information storing unit 300 by using the byte arrays, not the SQL, thus time required for data input and output is reduced.

Further, the trace information inputting device 200 may store the multiple pieces of the individual trace information in the trace information storing unit 300 only using the writing access.

That is, by storing information using insertion, not update, processes of determining whether previously stored data match new data to be stored, etc. may be omitted, thus the time required for the data input and output is reduced. Herein, the writing access may represent a low level disk access or a direct data stream without parsing the SQL, etc., but the scope of the present disclosure is not limited thereto.

Table 1 below shows examples of the byte arrays being inserted as-is into a database table.

TABLE 1

| GUID | execution flow number(s) | service start/end information | service module information | ... |
|---|---|---|---|---|
| ... | ... | ... | ... | |
| 1000 | 1.2 | Start | A | |
| 1000 | 1.2.1 | Start | B | |
| 1000 | 1.2.1.1 | Start | C | |
| 1000 | 1.2.1.1 | End | C | |
| 1000 | 1.2.1 | End | B | |
| 1000 | 1.2 | End | A | |
| ... | ... | ... | ... | |

By referring to Table 1, since six pieces of the trace information include the identical transaction identification information, that is, the GUID 1000, and said six pieces may be confirmed as the trace information corresponding to the request for processing the transactions from the client.

Further, three pieces of the trace information from top may be trace information on start of the service, and three pieces of the trace information from bottom may be trace information on end of the service.

Further, since 1.2, 1.2.1, and 1.2.1.1 are assigned respectively, as the transaction sequence information, to each of the three pieces of the trace information from the top, it is seen that a hierarchically lowest transaction sequence information is assigned to the third trace information.

Further, each piece of the trace information includes service module information, and thus the service module, processing the transaction corresponding to said each piece of the trace information, may be identified.

On the other hand, on condition that the multiple pieces of the individual trace information are stored in the trace information storing unit 300 as aforementioned, the individual trace information inputting device 200 may instruct the administrative user device 400 to (i) retrieve multiple pieces of specific trace information among the multiple pieces of the individual trace information from the trace information storing unit 300, and (ii) display the multiple pieces of the specific trace information to be used for confirmation by an administrative user.

Further, a specific server among the web server, the web application server, etc. or a specific service module in the specific server causing a failure may be isolated and displayed in a thorough manner. For example, if the specific service module in the web application server 120 fails, the trace information inputting device 200 may display the web server 110 or the database server 130 briefly, but may thoroughly display a current monitored situation of the web application server 120.

As an example, the trace information inputting device 200 may perform a process of instructing the administrative user device 400 to generate integrated trace information in which the multiple pieces of the specific trace information are correlated by referring to the transaction identification information and the transaction sequence information, and display the integrated trace information.

Specifically, the trace information inputting device 200 may perform a process of instructing the administrative user device 400 to correlate the multiple pieces of the specific trace information by referring to the GUID and the execution flow number, to thereby generate the integrated trace information.

As another example, the trace information inputting device 200 may perform a process of instructing the administrative user device 400 to correlate the multiple pieces of the specific trace information by further referring to the service start/end information and the service module information, to thereby generate the integrated trace information.

Herein, the specific trace information may include the multiple pieces of the trace information whose pieces of the transaction identification information are identical. Also, the integrated trace information may be trace information created by correlating the multiple pieces of the specific trace information by referring to the transaction sequence information.

That is, the trace information inputting device 200 may instruct the administrative user device 400 to (i) display each piece of the specific trace information which is desired by the administrative user among the multiple pieces of the individual trace information, or (ii) display the integrated trace information generated according to the transaction identification information and the transaction sequence information using the specific trace information.

For example, a case is assumed of (i) multiple pieces of 1-st trace information corresponding to a request for processing the transaction A, (ii) multiple pieces of 2-nd trace information corresponding to a request for processing the transaction B, and (iii) multiple pieces of 3-rd trace information corresponding to a request for processing a transaction C, being stored in the trace information storing unit 300, without regard to data organization.

Further, the transaction identification information assigned to the 1-st trace information may be the GUID 1000, the transaction identification information assigned to the 2-nd trace information may be a GUID 2000, and the transaction identification information assigned to the 3-rd trace information may be a GUID 3000.

In such a case, if the administrative user wants to view the multiple pieces of the 1-st trace information and the multiple pieces of the 2-nd trace information, then the trace information inputting device 200 may instruct the administrative user device 400 to classify the multiple pieces of the 1-st trace information and the multiple pieces of the 2-nd trace information, based on the transaction identification information, among the multiple pieces of the trace information stored in the trace information storing unit 300. Also, the trace information inputting device 200 may respectively sort the multiple pieces of the 1-st trace information and the multiple pieces of the 2-nd trace information based on the transaction sequence information.

As a result, the trace information inputting device 200 may instruct the administrative user device 400 to display 1-st integrated trace information into which the multiple pieces of the 1-st trace information are integrated, and 2-nd integrated trace information into which the multiple pieces of the 2-nd trace information are integrated.

Figure 3:
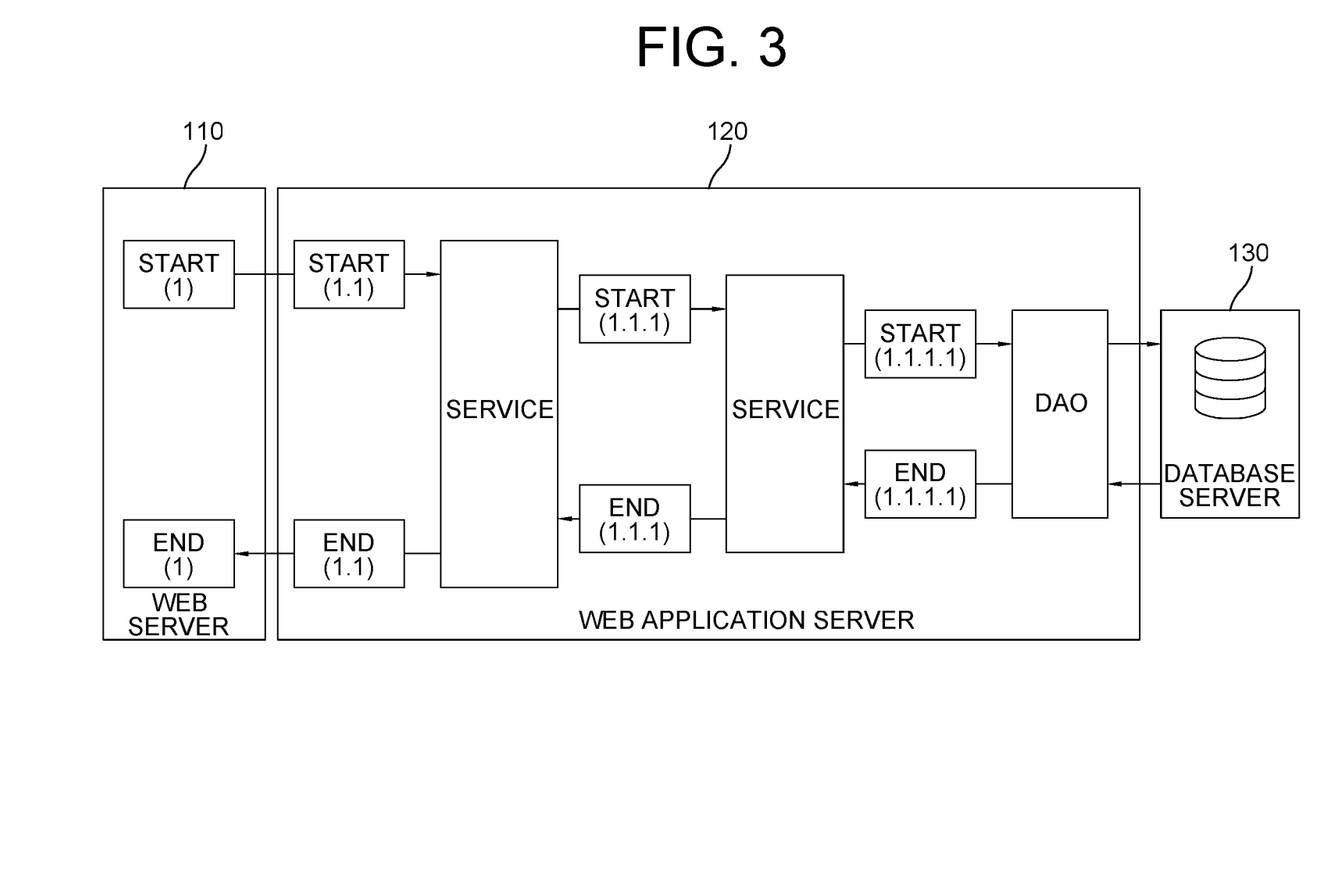
FIG. 3 is a drawing schematically illustrating a result of correlation displayed on the administrative user device in the method for efficient end-to-end monitoring of the massive transactions related to the monitored system in accordance with one example embodiment of the present disclosure.

Meanwhile, the integrated trace information is described by referring to FIG. 3.

FIG. 3 is a drawing schematically illustrating display of the integrated trace information into which the multiple pieces of the specific trace information are integrated, in the method for efficient end-to-end monitoring of the massive transactions related to the monitored system in accordance with one example embodiment of the present disclosure.

For reference, although the web server 110 and the database server 130 may also have a configuration similar to that of the web application server 120, handling of the request for processing the transactions is shown from a perspective of the service modules in the web application server 120 for convenience of explanation.

Beginning at a top left of FIG. 3, on condition that a GUID 1001 is assigned as the transaction identification information in response to the request for processing the transactions from the client, the web server 110 may assign the transaction sequence information of a top level, i.e., a highest hierarchy, to the request for processing the transactions. FIG. 3 shows the web server 110 assigning "1" as the transaction sequence information of the top level to the request for processing the transactions.

Sequentially, the request transaction may be transmitted from the web server 110 to the web application server 120, then the web application server 120 may generate a child sequence by recognizing, at a time of receiving the request transaction, that the request transaction is to be processed by a hierarchically lower entity, and may assign the transaction sequence information of "1.1" to the request transaction. Similar processes are repeated for a rest of the request transactions. However, for the response transactions, contrary to the processes for the request transactions, a process of removing each last part of each execution flow number of each child sequence one at a time may be performed.

Meanwhile, a case may be assumed in which, due to malfunction of applications, etc., an incorrect response to the request for processing the transactions, acquired from a client A, is transmitted to the client A, and then respective transactions, corresponding to the request for processing the transactions, are written onto a certain storage, thereafter, a correct response to the request for processing the transactions, acquired from the client A, is also transmitted, and respective transactions, corresponding to the request for processing the transactions, are also written onto the certain storage.

Conventionally, previously stored data are updated to new data by matching the previously stored data with the new data, in order to correct the previously stored data on the incorrect response as the new data on a correct response. However, if a method of the writing access only, i.e., direct insertion without parsing, is used, since the process of matching the previously stored data with the new data is eliminated, the previously stored data on the incorrect response coexist with the new data on the correct response. To prevent such coexistence, a master node 500 illustrated in FIG. 3 may operate according to a preset algorithm such that, for example, the previously stored data on the incorrect response is deleted except the most recent data.

The present disclosure has an effect of rapidly storing a large amount of information in a massive transaction situation.

The present disclosure has another effect of using minimal resource by performing correlation task using the administrative user device, to thereby display more information on the administrative device.

The present disclosure has still another effect of processing the correlation task on the trace information, based on the transaction sequence information and the transaction identification information, to thereby allow tracking of whole work flow even when times of different servers are not synchronized.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for efficient end-to-end monitoring of massive transactions related to a monitored system, the monitored system including at least one web server, and at least one web application server, comprising steps of:
   (a) a trace information inputting device performing a process of instructing the web server and the web application server included in the monitored system to generate each of multiple pieces of individual trace information including transaction identification information and transaction sequence information, the trace information inputting device being a separate device from the monitored system;
   (b) under a condition the multiple pieces of the individual trace information, including the transaction identification information and the transaction sequence information, are acquired by the trace information inputting device from the web server and the web application server, the trace information inputting device performing a process of storing the multiple pieces of the individual trace information in a trace information storing unit; and
   (c) the trace information inputting device performing a process of instructing an administrative user device of an administrative user to (i) retrieve multiple pieces of specific trace information among the individual trace information from the trace information storing unit, and (ii) display the multiple pieces of the specific trace information to be used for confirmation by the administrative user, the administrative user device being a different device than the trace information inputting device and the monitored system,
   wherein, at the step of (b), the trace information inputting device performs a process of storing the multiple pieces of the individual trace information in the trace information storing unit, only using a writing access, and
   wherein, step (c) further comprising instructing the administrative user device to generate integrated trace information by correlating multiple pieces of the specific trace information from the transaction identification information and the transaction sequence information, and displaying the integrated trace information.

2. The method of claim 1, wherein, at the step of (a), if a request for processing transactions is acquired from a client, the trace information inputting device performs a process of instructing the web server and the web application server included in the monitored system to assign identical transaction identification information and each piece of hierarchical transaction sequence information to each of the transactions of each of the web server and the web application server, to thereby generate each of the multiple pieces of the individual trace information corresponding to the request.

3. The method of claim 2, wherein, at the step of (a), on condition that the web server includes a 1-st service module to an m-th service module wherein m is an integer larger than 0, and that the web application server includes an (m+1)-th service module to an n-th service module wherein n is an integer larger than said m, the trace information inputting device performs a process of instructing the web server and the web application server to assign each piece of the hierarchical transaction sequence information to each of the transactions corresponding to the request,
   wherein k-th transaction sequence information is assigned to a request transaction transmitted from a k-th service module to a (k+1)-th service module and to a response transaction transmitted from the (k+1)-th service module to the k-th service module and k is an integer larger than 0 and less than n and,
   wherein, in case said k is larger than 1, the k-th transaction sequence information is hierarchically lower than (k−1)-th transaction sequence information, the (k−1)-th transaction sequence information being assigned to a request transaction transmitted from a (k−1)-th service module to the k-th service module and to a response transaction transmitted from the k-th service module to the (k−1)-th service module.

4. The method of claim 3, wherein the trace information inputting device performs a process of instructing the web server and the web application server included in the monitored system to assign the identical transaction identification information to each of request transactions and each of response transactions, created and transmitted in response to the request, to which each of 1-st transaction sequence information to (n−1)-th transaction sequence information is assigned.

5. The method of claim 1, wherein, at the step of (b), the trace information inputting device performs a process of storing the multiple pieces of the individual trace information, including the transaction identification information and the transaction sequence information, in the trace information storing unit as one or more byte arrays.

6. The method of claim 1, wherein the transaction identification information includes at least one GUID (Globally Unique Identifier), and the transaction sequence information includes at least one execution flow number, and
   wherein, at the step of (c), the trace information inputting device performs a process of instructing the administrative user device to correlate the multiple pieces of the specific trace information by referring to the GUID and the execution flow number, to thereby generate the integrated trace information.

7. The method of claim 6, wherein the multiple pieces of the individual trace information further includes service start/end information and service module information, and wherein, at the step of (c), the trace information inputting device performs a process of instructing the administrative user device to correlate the multiple pieces of the specific trace information by further referring to the service start/end information and the service module information, to thereby generate the integrated trace information.

8. A trace information inputting device for efficient end-to-end monitoring of massive transactions related to a monitored system including at least one web server, and at least one web application server, comprising:
   at least one memory that stores instructions; and
   at least one processing circuitry configured to execute the instructions to perform or support another device to perform: (I) a process of instructing the web server and the web application server included in the monitored system to generate each of multiple pieces of individual trace information including transaction identification information and transaction sequence information, (II) under a condition the multiple pieces of the individual trace information, including the transaction identification information and the transaction sequence information, are acquired from the web server and the web application server, a process of storing the multiple pieces of the individual trace information in a trace information storing unit, and (III) a process of instructing an administrative user device of an administrative user to (i) retrieve multiple pieces of specific trace information among the individual trace information from the trace information storing unit, and (ii) display the multiple pieces of the specific trace information to be used for confirmation by the administrative user, the administrative user device being a different device than the trace information inputting device and the monitored system,
   wherein, at the process of (II), the processing circuitry performs a process of storing the multiple pieces of the individual trace information in the trace information storing unit, only using a writing access, and
   wherein, at the process of (III), the processing circuitry further performs a process of instructing the administrative user device to generate integrated trace information by correlating multiple pieces of the specific trace information from the transaction identification information and the transaction sequence information, and a process of displaying the integrated trace information.

9. The trace information inputting device of claim 8, wherein, at the process of (I), if a request for processing transactions is acquired from a client, the processing circuitry performs a process of instructing the web server and the web application server included in the monitored system to assign identical transaction identification information and each piece of hierarchical transaction sequence information to each of the transactions of each of the web server and the web application server, to thereby generate each of the multiple pieces of the individual trace information corresponding to the request.

10. The trace information inputting device of claim 9, wherein, at the process of (I), on condition that the web server includes a 1-st service module to an m-th service module wherein m is an integer larger than 0, and that the web application server includes an (m+1)-th service module to an n-th service module wherein n is an integer larger than said m, the processing circuitry performs a process of instructing the web server and the web application server to assign each piece of the hierarchical transaction sequence information to each of the transactions corresponding to the request,
   wherein k-th transaction sequence information is assigned to a request transaction transmitted from a k-th service module to a (k+1)-th service module and to a response transaction transmitted from the (k+1)-th service module to the k-th service module and k is an integer larger than 0 and less than n and,
   wherein, in case said k is larger than 1, the k-th transaction sequence information is hierarchically lower than (k−1)-th transaction sequence information, the (k−1)-th transaction sequence information being assigned to a request transaction transmitted from a (k−1)-th service module to the k-th service module and to a response transaction transmitted from the k-th service module to the (k−1)-th service module.

11. The trace information inputting device of claim 10, wherein the processing circuitry performs a process of instructing the web server and the web application server included in the monitored system to assign the identical transaction identification information to each of request transactions and each of response transactions, created and transmitted in response to the request, to Which each of 1-st transaction sequence information to (n−1)-th transaction sequence information is assigned.

12. The trace information inputting device of claim 8, wherein, at the process of (II), the processing circuitry performs a process of storing the multiple pieces of the individual trace information, including the transaction identification information and the transaction sequence information, in the trace information storing unit as one or more byte arrays.

13. The trace information inputting device of claim 1, wherein the transaction identification information includes at least one GUID (Globally Unique Identifier), and the transaction sequence information includes at least one execution flow number, and
   wherein, at the process of (III), the processing circuitry performs a process of instructing the administrative user device to correlate the multiple pieces of the specific trace information by referring to the GUID and the execution flow number, to thereby generate the integrated trace information.

14. The trace information inputting device of claim 13, wherein the multiple pieces of the individual trace information further includes service start/end information and service module information, and
   wherein, at the process of (III), the processing circuitry performs a process of instructing the administrative user device to correlate the multiple pieces of the specific trace information by further referring to the service start/end information and the service module information, to thereby generate the integrated trace information.

* * * * *